(12) United States Patent
Cuan et al.

(10) Patent No.: US 11,568,349 B2
(45) Date of Patent: *Jan. 31, 2023

(54) COMPUTER-BASED SYSTEMS CONFIGURED TO DETECT FRAUDULENT ACTIVITIES RELATED TO CARD-TRANSACTING DEVICES AND METHODS OF USE THEREOF

(71) Applicant: Capital One Services, LLC, McLean, VA (US)

(72) Inventors: Lukiih Cuan, Washington, DC (US); Joshua Edwards, Philadelphia, PA (US); Latika Gulati, Annandale, VA (US)

(*) Notice: Subject to any disclaimer, the term of this patent is extended or adjusted under 35 U.S.C. 154(b) by 35 days.

This patent is subject to a terminal disclaimer.

(21) Appl. No.: 17/373,677

(22) Filed: Jul. 12, 2021

(65) Prior Publication Data

US 2021/0334715 A1    Oct. 28, 2021

Related U.S. Application Data

(63) Continuation of application No. 16/784,835, filed on Feb. 7, 2020, now Pat. No. 11,062,248.

(51) Int. Cl.

| | |
|---|---|
| *G06Q 10/06* | (2012.01) |
| *G06Q 30/02* | (2012.01) |
| *G06Q 30/00* | (2012.01) |
| *G07F 19/00* | (2006.01) |
| *G06Q 50/26* | (2012.01) |

(Continued)

(52) U.S. Cl.
CPC ......... *G06Q 10/0635* (2013.01); *G06F 16/21* (2019.01); *G06Q 20/1085* (2013.01); *G06Q 20/4016* (2013.01); *G06Q 30/0185* (2013.01); *G06Q 30/0208* (2013.01); *G06Q 30/0215* (2013.01); *G06Q 40/02* (2013.01); *G06Q 50/265* (2013.01); *G07D 11/225* (2019.01); *G07D 11/235* (2019.01); *G07D 11/26* (2019.01); *G07F 19/207* (2013.01); *G07F 19/209* (2013.01); *G07F 19/2055* (2013.01)

(58) Field of Classification Search
CPC .......... G06Q 10/0635; G06Q 20/4016; G06Q 40/02; G06Q 30/0215; G06Q 50/265; G06Q 30/0208; G06Q 20/1085; G06Q 30/0185; G07D 11/225; G07D 11/235; G07D 11/26; G07F 19/209; G07F 19/207; G07F 19/2055; G06F 16/21
See application file for complete search history.

(56) References Cited

U.S. PATENT DOCUMENTS

2018/0176727 A1* 6/2018 Williams ............. A61B 5/6802

* cited by examiner

*Primary Examiner* — Jeffrey A Shapiro
(74) *Attorney, Agent, or Firm* — Greenberg Traurig, LLP

(57) ABSTRACT

Systems and methods of detecting fraudulent activity including skimmers adapted to compromise transacting devices such as automated teller machines (ATMs) are disclosed. In one embodiment, an exemplary computer-implemented method may comprise determining that a subject device has a risk level higher than a risk threshold, providing a push notification to a mobile device proximal to the subject device, executing a software application executed by the mobile device for gathering information and transmitting feedback regarding the subject device, and providing an incentive, upon receipt of the feedback, to, for example, an account or device associated with an individual involved with the feedback or interaction with the device.

20 Claims, 7 Drawing Sheets

(51) Int. Cl.
*G06Q 20/10* (2012.01)
*G06F 16/21* (2019.01)
*G06Q 40/02* (2012.01)
*G07D 11/235* (2019.01)
*G07D 11/225* (2019.01)
*G07D 11/26* (2019.01)
*G06Q 20/40* (2012.01)

COMPUTER-BASED SYSTEMS CONFIGURED TO DETECT FRAUDULENT ACTIVITIES RELATED TO CARD-TRANSACTING DEVICES AND METHODS OF USE THEREOF

CROSS-REFERENCE TO RELATED APPLICATION(S) INFORMATION

The present application is a continuation of U.S. patent application Ser. No. 16/784,835, filed Feb. 7, 2020, now U.S. Pat. No. 11,062,248, which are incorporated herein by reference in entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved computer-implemented methods, improved computer-based platforms or systems, improved computing components and devices configured for one or more novel technological applications involving biometric authentication aspects configured for various functionality such as handling exceptions, enabling deactivation in certain instances and/or performing other features.

BACKGROUND OF TECHNOLOGY

A computer network platform/system may include a group of computers (e.g., clients, servers, computing clusters, cloud resources, etc.) and other computing hardware devices that are linked and communicate via software architecture, communication applications, and/or software applications associated with electronic transactions, data processing, and/or account management involved with card-based transactions and/or associated fraud prevention.

SUMMARY OF DESCRIBED SUBJECT MATTER

In some embodiments, the present disclosure provides various exemplary technically improved computer-implemented methods involving fraud prevention associated with card-based transactions, the method comprising steps such as:

generating, by at least one processor associated with at least one entity, a database of information regarding risk levels of a plurality of transacting devices, such as automated teller machines (ATMs);

determining that a subject ATM of the plurality of ATMs has a risk level higher than a risk threshold;

generating and transmitting, to at least one mobile device proximal to the subject ATM, a push notification to the at least one mobile device, the at least one mobile device associated with at least one individual known by the at least one entity;

executing, upon acceptance of the push notification by the at least one individual, a software application executed by the at least one mobile device, the software application comprising:

transmitting information or instructions to the at least one mobile device that direct the at least one individual to the subject ATM;

detecting when the at least one individual is located at the subject ATM;

providing an instruction for the at least one individual to facilitate an interaction with the subject ATM by one or both of the at least one mobile device and/or the at least one individual, the interaction including using the subject ATM and/or perform at least one inspection action regarding the subject ATM;

gathering information, by the at least one mobile device, regarding the subject ATM;

transmitting feedback, from the at least one mobile device to the at least one processor, regarding the subject ATM, the feedback comprising evaluation regarding one or both of usage of the subject ATM and/or inspection of the subject ATM; and providing an incentive, via the least one processor, upon receipt of the feedback, to an account or device associated with the at least one individual who completed the instruction.

In some embodiments, the present disclosure also provides exemplary technically improved computer-based systems, and computer-readable media, including computer-readable media implemented with and/or involving one or more software applications, whether resident on computer devices or platforms, provided for download via a server and/or executed in connection with at least one network and/or connection, that include or involve features, functionality, computing components and/or steps consistent with those set forth herein.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
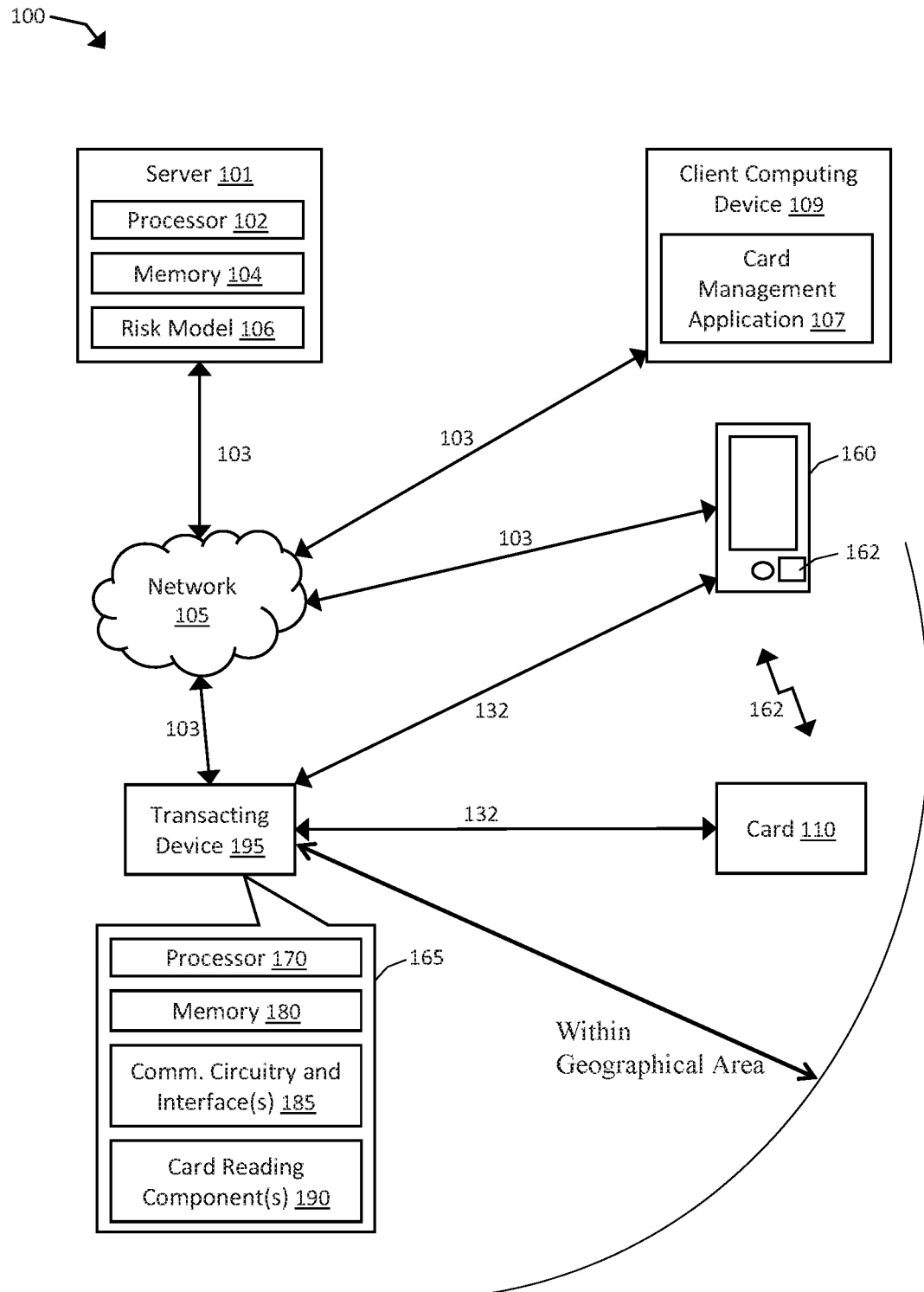
FIG. 1 is a block diagram of an exemplary system and/or platform involving fraud prevention features for card-based transactions, consistent with exemplary aspects of certain embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

As explained in more detail, below, various exemplary computer-based systems and methods of the present disclosure allow for improved detection of fraudulent activity such as, but not limited to, skimmers configured to compromise transacting devices such as, but not limited to, automated teller machines (ATMs) configured for card-based transactions. In one embodiment, an exemplary computer-implemented method of the present disclosure may include generating a database of information regarding risk levels of a plurality of transacting devices or ATMs, determining that a subject device or ATM has a risk level higher than a risk threshold, providing a push notification to a mobile device user who is nearby and able to interact with the subject device or ATM, executing a software application executed by the mobile device for gathering information and transmitting feedback regarding the subject device or ATM, and providing an incentive, upon receipt of the feedback, to an account or device associated with the user who interacted with the device or ATM.

While the acronym ATM (automated teller machine) is used frequently herein, it should be understood that the disclosed technology pertains to any relevant transacting device with which the transaction cards herein interact, i.e., the devices on which skimmers or other fraud-attempting technology or hacks may be deployed. Non-limiting examples of such transaction devices include POS (point-of-service, point-of-sale, etc.) devices, payment kiosks, and any other type of transaction card reader (magnetic or otherwise) that reads or receives card or customer information based on interaction of a transaction card with such device.

Various embodiments disclosed herein may be implemented in connection with one or more entities that provide, maintain, manage, or otherwise offer any services via transacting devices. In some embodiments, exemplary entity may be a financial service entity that provides, maintains, manages, or otherwise offers financial services. Such financial service entity may be a bank, credit card issuer, or any other type of financial service entity that generates, provides, manages, and/or maintains financial service accounts that entail providing a transaction to one or more customers, the transaction card configured for use at an ATM to access an associated financial service account. Financial service accounts may include, for example, credit card accounts, bank accounts such as checking and/or savings accounts, reward or loyalty program accounts, debit account, and/or any other type of financial service account known to those skilled in the art.

FIG. 1 depicts an exemplary computer-based system 100 illustrating aspects of improved fraud prevention associated with use of a transaction cards at transacting devices such as ATMs, in accordance with one or more embodiments of the present disclosure. System 100 may include at least one server 101, at least one mobile device 160, at least one transaction card 110, and at least one transacting device 195, which may all communicate 103 over at least one communication network 105. Transacting device 195 may be an automated teller machine (ATM), a comparable POS (point-of-sale, point-of-service, etc.) device, or other terminal or computer that processes transactions authorized via a transaction card 110, as explained above. As a result of losses incurred by skimmers and other fraud occurring at transacting device 195, the business or merchant associated with the transacting device 195 and typically a financial institution, such as a credit card company that has issued the card 110 to the user, have incentive and desire to determine whether or not a skimmer or other fraud is being implemented by a fraudster at the transacting device 195. Embodiments herein relate to systems and methods whereby such businesses, merchants and/or financial institutions can 'crowdsource' assessment of transacting devices 195 to card owners who are determined to be in the vicinity of a transacting device in a suspect location and/or suspected of being compromised. Here, for example, embodiments herein may also leverage the fact that the user of the transaction card is often near to the user's mobile device, such as a smartphone, smartwatch, tablet or the like, for example, and may use functionality associated with the user's mobile device and the transaction card, including interaction between the two, as a part of various fraud prevention processes set forth herein.

The exemplary system of FIG. 1 may include an exemplary computing device 109, such as at least one client computing device, associated with at least one user, such as an owner of the transaction card 110. In some embodiments, the exemplary computing device 109 may be configured to execute, among other programs, a card management application 107. In some embodiments, exemplary card management application 107 may be one or more software applications configured to perform operations consistent with providing an app, e.g., for mobile device 160, and/or a portal, e.g., via web pages, to the user, for accessing online accounts and managing various other aspects of accounts associated with the transaction card 110. The exemplary card management application 107 may provide various functionalities associated with managing a transaction card as well as functionality involved with the fraud prevent features herein, such as shown and described below in connection with FIGS. 2-3. Card management application 107 may also be hosted and/or operated, in whole or in part, by at least one remote system and/or server, such as by a server 101 associated with a financial services entity that provides the transaction card 110 to a card owner.

In some embodiments, server(s) 101 may be associated with one or more entities that are stakeholders to card transactions at the transacting device 195, such as the business or merchant, one or more financial services providers, such as an issuer of a credit card, debit card, or other transaction card associated with the attempted transaction.

In the embodiment shown in FIG. 1, an illustrative transacting device 195 may comprise: one or more processing components and/or computer readable media 170, memory 180, communication circuitry and/or interfaces 185, and at least one card reading component 190. Such card reading component(s) 190 may be configured to read information from a transaction card 110; for example, the at least one card reading component may comprising one or more of a magnetic stripe reader, a chip reader, and/or a first near field communication (NFC) component. Communication circuitry and/or interfaces 185 may comprise at least one mobile device transceiver component configured to communicate, during execution of a purchase transaction, with a mobile device 160 presented for payment, the mobile device transceiver component comprising a second NFC component.

In some embodiments, exemplary processing components and/or computer readable media 170 may be configured to execute instructions associated with performing methods such as that described below in more detail in connection with FIGS. 2 and 3 and elsewhere herein.

Referring to FIG. 1, server 101 may include at least one processor 102, a memory 104, such as random-access memory (RAM), and a risk model 106 that quantifies risk for various transacting devices or ATMs of interest. In some embodiments, server 101 may be operated by the entity issuing the transaction card, by the merchant, and/or by any transaction processing entity involved with authorizing the transaction card for use. According to some embodiments, the risk model 106 may determine or establish a risk level for the transacting devices or ATMs based on one or more of: crime rate information associated with the location of each ATM; fraud information associated with each ATM; a fraud rate associated with each ATM; one or more reports and/or news articles regarding fraud and/or crime associated with the location of each ATM; information regarding video and/or other surveillance coverage of each ATM; and/or the timing or thoroughness of the last inspection (e.g., risk level would be fairly low on an ATM that was checked an hour ago).

In some embodiments, the transaction card 110 may be a traditional credit card or debit card, and may be formed from plastic, metal, or any other suitable material.

Mobile device 160, such as a smart phone or other portable or wearable electronic device, may include mobile device circuitry 162. Mobile device circuitry 162 may include a mobile device processor, memory such as RAM, computer-readable media, communication circuitry and interface, and/or any input and/or output device, such as a touchscreen display. The memory may store code that, when executed by processor, may cause processor to implement one or more aspects of various fraud prevention schemes herein, including those involving: (1) directing/navigating a card owner to a suspect ATM, (2) executing a software application on the mobile device 160, such as for evaluating and/or inspecting an ATM, and/or (3) pairing with transaction card 110 to perform various other related functionality. Mobile device may also display various graphical user interfaces that a card owner may utilize to implement, or when implementing, certain fraud prevention features herein. In some embodiments, any transaction card application running on mobile device 160, such as an application supplied by the entity issuing the transaction card and/or managing the transactions of the transaction card owner, may include various modules that may transmit information to the transacting device, relay information back to the entity (e.g., server 101), and/or communicate with other computing components.

Various embodiments associated with FIG. 1 and related disclosure herein solve a technical problem of detecting skimmers and other fraudulent activity associated with card-based transactions via implementation of mobile-device-based solutions that include features and functionality for preventing fraudulent transactions. Various features and functionality disclosed herein may be utilized in connection with fraud prevention and/or authentication processes that involve pairing of transaction card 110 with mobile device 160 while executing a software application on the mobile device 160 for interacting with and gathering information regarding a subject ATM. In other embodiments, various information gathered via the mobile device 160 and/or the device or card owner may be relayed back to server 101 (e.g., server processor 102) so as to perform more detailed fraud assessment of the ATM, such as to determine whether or not a skimmer or other fraud is being attempted at the transacting device 195 of interest.

In some embodiments, an initial authentication for pairing the transaction card with the mobile device may be implemented by the user contacting the entity from the user's mobile device to initially authorize the pairing of transaction card 110 with mobile device 160 so as to receive pairing approval. In other embodiments, the pairing and/or unpair processes between the transaction card and the mobile device may occur automatically and seamlessly such as without any action on the part of the user, particularly if the same mobile device had been previously paired with the same transaction card in the past. In yet other embodiments, proximity MFA may use biometrics (e.g., fingerprint, voice recognition, etc.) and/or a password entered by the user and/or a swiping of the mobile device screen by a finger of the user and/or the proximity of the transaction card to the mobile device or any client device, for example, to pair or unpair the transaction card with the mobile device or client.

While only one server 101, computing device 109, network 105, ATM device 195, mobile device 160, and card 110 are shown, it will be understood that system 100 may include more than one of any of these components. More generally, the components and arrangement of the components included in system 100 may vary. Thus, system 100 may include other components that perform or assist in the performance of one or more processes consistent with the disclosed embodiments. Computing device 109 may be one or more computing devices configured to perform operations consistent with executing card management application 107.

Figure 2:
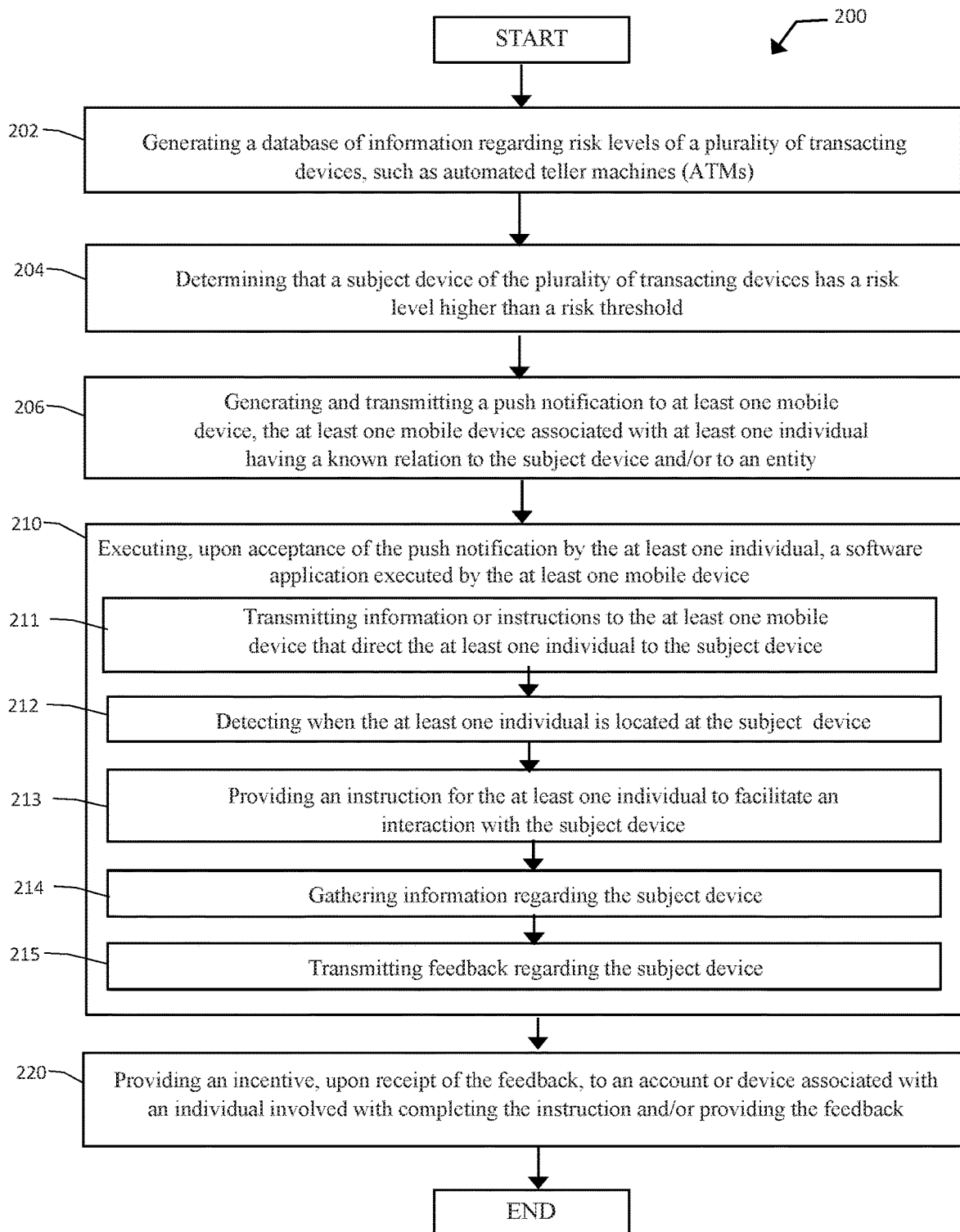
FIG. 2 is a flowchart illustrating an exemplary process related to performing fraud prevention associated with card-based transactions, consistent with exemplary aspects of certain embodiments of the present disclosure.

FIG. 2 is a flowchart illustrating an exemplary process related to performing fraud prevention associated with card-based transactions, consistent with exemplary aspects of certain embodiments of the present disclosure. As shown in the exemplary flowchart of FIG. 2, an illustrative fraud and skimmer detection process 200 may comprise: generating a database of information regarding risk levels of a plurality of automated teller machines (ATMs), at 202; determining that a subject ATM of the plurality of ATMs has a risk level higher than a risk threshold, at 204; generating and transmitting a push notification to at least one mobile device, the at least one mobile device associated with at least one individual known by the at least one entity, at 206; executing, upon acceptance of the push notification by the at least one individual, a software application executed by the at least one mobile device, at 210; and providing an incentive, upon receipt of a feedback, to an account or device associated with the at least one individual who completed an instruction, at 220. Further, the fraud and skimmer detection process 200 may be carried out, in whole or in part, in conjunction with a mobile device that is connected via one or more networks to a server, which is executing instructions for performing one or more steps or aspects of various embodiments described herein.

In some embodiments, fraud and skimmer detection process 200 may include, at 202, a step of generating a database of information regarding risk levels of a plurality of automated teller machines (ATMs). In some embodiments, step 202 may be performed by at least one processor, such as a processor associated with at least one entity. Such entity may be a financial institution such as a bank, credit card issuer, or any other type of financial service entity that generates, provides, manages, and/or maintains financial service accounts for one or more individuals.

The fraud and skimmer detection process 200 may include, at 206, a step of generating and transmitting a push notification to at least one mobile device, the at least one mobile device associated with at least one individual known by the at least one entity. Further, according to various disclosed embodiments, the at least one mobile device may be determined to be proximal to the subject ATM, or otherwise having a geographic association with the subject ATM (e.g., the subject ATM is near their home, work, or other expected location), prior to transmitting such push notification. In some embodiments, the push notification may include an inquiry asking if the individual is willing to perform at least one fraud-prevention task associated with the subject ATM. Additionally, the push notification may include education information regarding one or both of: how to detect fraud potentially being perpetrated via the subject ATM, and/or how to detect whether the subject ATM has been compromised by addition of a skimmer. Further, such push notification may include an information overlay of augmented reality (AR) to provide an improved user experience with the subject ATM for the individual.

The fraud and skimmer detection process 200 may include, at 210, a step of executing, upon acceptance of the push notification by the individual, a software application executed by the individual's mobile device. In some embodiments, such software application may execute instructions on the mobile device including: transmitting information or instructions to the at least one mobile device that direct the at least one individual to the subject ATM, at 211; detecting when the at least one individual is located at the subject ATM, at 212; providing an instruction for the at least one individual to facilitate an interaction with the subject ATM, at 213; gathering information regarding the subject ATM, at 214; transmitting feedback regarding the subject ATM, at 215, the feedback comprising evaluation regarding one or both of the usage of the subject ATM, and/or inspection of the subject ATM.

With regard to step 211, various embodiments herein may be configured such that the information or instructions comprise one or more of: location information; navigation instructions; and/or map application data sent to the at least one mobile device of the at least one individual, which provide directions to the subject ATM.

With regard to step 212, in some embodiments, detecting when the at least one individual is located at the subject ATM may comprise one or more of: (i) detecting presence of the at least one individual by a camera at or adjacent the subject ATM; (ii) determining whether or not the at least one individual is located at the subject ATM via location-determining functionality of the at least one mobile device; and/or (iii) verifying the authentication credentials that the at least one individual provides to the subject ATM. In some embodiments, confirmation that the at least one individual is located at the subject ATM may be obtained via authentication against the ATM. Here, for example, such individual may have just used the ATM, and knowledge of this use may be employed to both ask them to analyze the ATM and, relatedly, determine or confirm that they are still located at the ATM, or have returned to the ATM shortly after such use.

With regard to step 213, various embodiments herein may be configured to provide the instruction for the at least one individual to facilitate the interaction with the subject ATM by one or both of: the at least one mobile device; and/or the at least one individual. Here, for example, such interaction may include one or both of using the subject ATM, and/or performing at least one inspection action regarding the subject ATM.

With regard to step 214, various implementations herein may be configured such that step 214 is performed by the at least one mobile device. In some embodiments, the information may be gathered via taking pictures or streaming video of the subject ATM via the individual's mobile device, it may be gathered by the individual (e.g., via visual inspection of the subject ATM) and then input into the individual's mobile device, or it may be gathered via other interaction(s) involving the individual, the subject ATM, and/or the mobile device or app resident thereon.

With regard to step 215, various embodiments herein may be configured to transmit the feedback regarding the subject ATM, from the at least one mobile device to the at least one processor. Here, for example, the feedback may comprise evaluation regarding one or both of usage of the subject ATM, and/or inspection of the subject ATM.

The fraud and skimmer detection process 200 may also include, at 220, a step of providing an incentive, upon receipt of the feedback, to an account or device associated with the at least one individual involved with performing the instruction or feedback. In some implementations, step 220 may be performed by an interested entity via at least one server or processor associated with their financial platform. In some instances, the incentive may be monetary compensation, a credit, or the provision of some other item of value, such as a deposit and/or reward. According to other embodiments, providing such incentive may comprise one or both of transmitting gamification information, and/or a gamification award, to at least one individual involved with completed the instruction or providing the feedback. Such gamification may include, for example, a leaderboard or other suitable ways of recognizing those who are providing such feedback in more helpful or valuable ways.

According to some embodiments, methods herein may also comprise establishing a risk level for the ATMs based on one or more of: crime rate information associated with the location of each ATM; fraud information associated with each ATM; a fraud rate associated with each ATM; one or more reports and/or news articles regarding fraud and/or crime associated with the location of each ATM; information regarding video and/or other surveillance coverage of each ATM; and/or the timing or thoroughness of the last inspection (e.g., risk level would be fairly low on an ATM that was checked an hour ago).

According to other embodiments, methods herein may also comprise performing a search to identify the at least one mobile device proximal to the subject ATM, e.g., when the risk level is determined to be higher than the risk threshold for the subject ATM.

Moreover, particularly when the feedback indicates that the subject ATM may be compromised, implementations herein may also comprise increasing a risk level associated with the subject ATM.

According to some embodiments, methods herein may also comprise generating and transmitting additional push notifications to one or more other individuals, such as to evaluate whether or not the subject ATM has been compromised with the skimmer, when the feedback indicates that the subject ATM may be compromised with a skimmer. Here, for example, the one or more other individuals may also be those known to or associated with the at least one entity.

In some embodiments, methods herein may also comprise determining, by the feedback, that the subject ATM has been compromised, and/or initiating at least one additional security measure for one or more users who used or use the subject ATM. According to various aspects of the disclosed technology, such security measure may comprise one or more of: placing a hold on ATM cards that were used with the subject ATM; automatically reissuing the ATM cards that were used with the subject ATM; increasing a fraud risk score of one or more accounts associated with the ATM cards that were used with the subject ATM; and/or transmitting, to devices or accounts associated with the one or more users who used or use the subject ATM, at least one fraud notification including one or both of (i) information regarding usage of the subject ATM determined to be compromised, and/or (ii) an action to take or a risk associated with usage of a compromised ATM.

Figure 3:
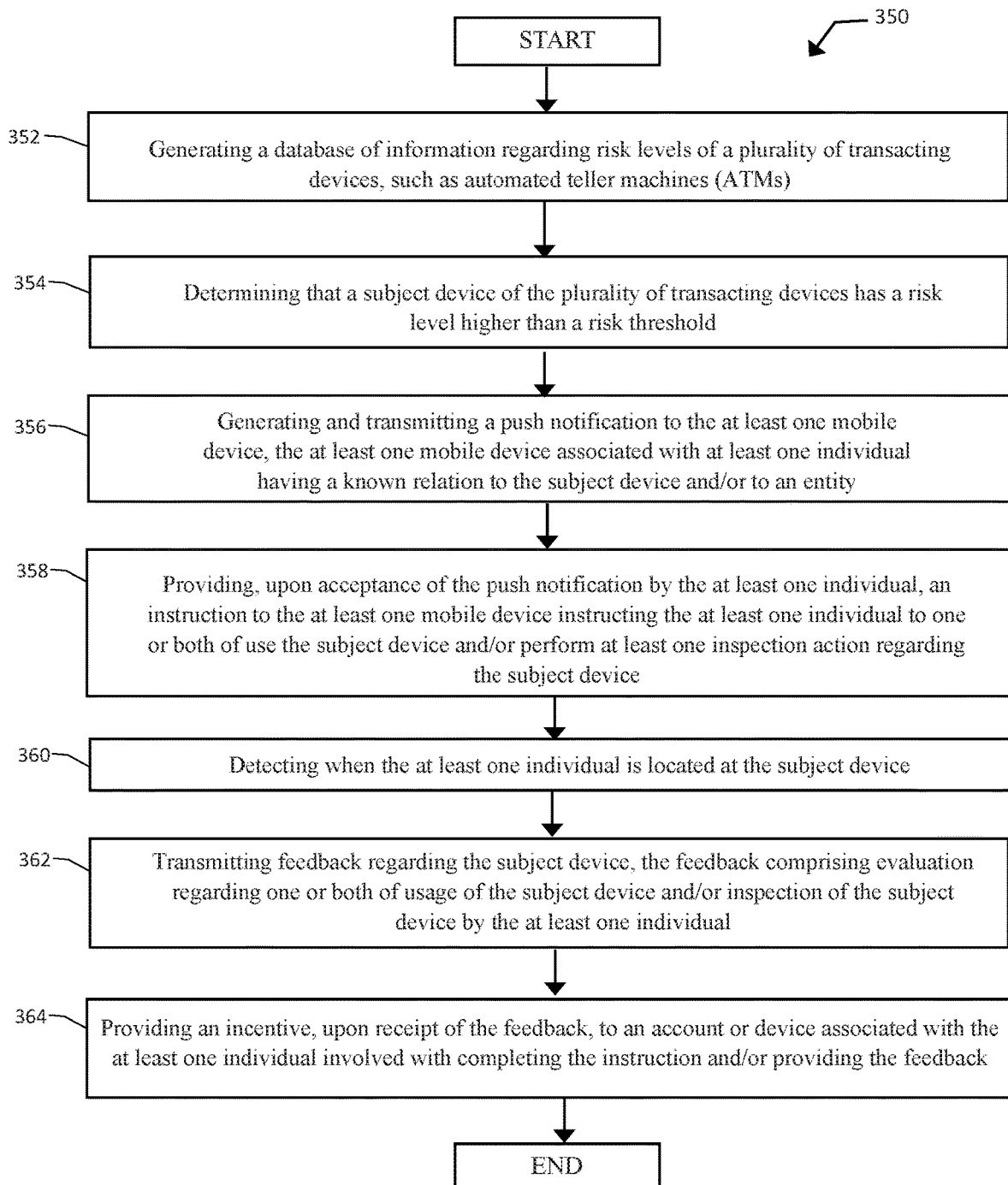
FIG. 3 is a flowchart illustrating another exemplary process related to performing fraud prevention associated with card-based transactions, consistent with exemplary aspects of certain embodiments of the present disclosure.

FIG. 3 is a flowchart illustrating another exemplary process 350 related to fraud and skimmer detection, consistent with exemplary aspects of at least some embodiments of the present disclosure. Referring to FIG. 3, the illustrative fraud and skimmer detection process 350 may comprise: generating a database of information regarding risk levels of a plurality of transacting devices 195, such as automated teller machines (ATMs), at 352; determining that a subject device (hereafter subject ATM) of the plurality of transacting devices has a risk level higher than a risk threshold, at 354; generating and transmitting a push notification to at least one mobile device, the at least one mobile device associated with at least one individual having a known relation to the subject device and/or to a entity, at 356; providing, upon acceptance of the push notification by the at least one individual, an instruction to the at least one mobile device instructing the at least one individual to one or both of: use the subject ATM; and/or perform at least one inspection action regarding the subject ATM, at 358; detecting when the at least one individual is located at the subject ATM, at 360; transmitting feedback regarding the subject ATM, the feedback comprising evaluation regarding one or both of: usage of the subject ATM; and/or inspection of the subject ATM by the at least one individual, at 362; and providing an incentive, upon receipt of the feedback, to an account or device associated with the at least one individual involved with completing the instruction and/or providing the feedback, at 364. Further, the fraud and skimmer detection process 350 may be carried out, in whole or in part, in conjunction with a mobile device that is connected via one or more networks to a server, which is executing instructions for performing one or more steps or aspects of various embodiments described herein.

In some embodiments, fraud and skimmer detection process 350 may include, at 352, a step of generating a database of information regarding risk levels of a plurality of transacting devices, such as automated teller machines (ATMs). In some implementations, step 352 may be performed by at least one processor, such as a processor associated with at least one entity involved with transactions at the transacting devices. Such entity may be a financial institution such as a bank, credit card issuer, or any other type of financial service entity that generates, provides, manages, and/or maintains financial service accounts for one or more customers.

The fraud and skimmer detection process 350 may include, at 356, a step of generating and transmitting a push notification to at least one mobile device, the at least one mobile device associated with at least one individual having a known relation to the subject device and/or to an involved entity. Here, for example, the at least one mobile device may be proximal to the subject device (hereafter, "subject ATM"). In some embodiments, the push notification may include an inquiry asking if the at least one individual is willing to perform at least one fraud-prevention task associated with the subject ATM. In other embodiments, such push notification may include education information regarding one or both of how to detect fraud potentially being perpetrated via the subject ATM, and/or how to detect whether the subject ATM has been compromised by addition of a skimmer. In one embodiment, such push notification may further include an information overlay of augmented reality (AR) to provide an improved user experience with the subject ATM for the at least one individual.

The fraud and skimmer detection process 350 may include, at 358, a step of providing, upon acceptance of the push notification by the at least one individual, an instruction to the at least one mobile device instructing the at least one individual to one or both of use the subject ATM, and/or perform at least one inspection action regarding the subject ATM.

The fraud and skimmer detection process 350 may include, at 360, a step of detecting when the at least one individual is located at the subject ATM. According to various embodiments, detecting when the at least one individual is located at the subject ATM may comprise one or both of: (i) detecting the presence of the at least one individual by a camera at or adjacent the subject ATM; and/or (ii) determining whether or not the at least one individual is located at the subject ATM via location-determining functionality of the at least one mobile device. Other ways of determining or detecting whether the individual is at a subject transacting device or ATM may also be used, for example, the transacting device or ATM may obtain biometric information, such as a fingerprint, facial recognition, or the like (whether verified via the transacting device 195 or via the mobile device 160), and/or utilize other technology, such as a near-field communication (NFC) components to verify that a person conducting the interaction is the authorized card owner.

According to some embodiments, additional security to protect the card owner's account may also be employed. In one implementation, for example, an entity may generate a temporary or artificial pin (e.g., a virtual number, etc) that the entity will authorize and recognize for the card owner, such as just at the subject transacting device or ATM, in parallel with the stripe detection. Here, then, knowledge of this artificial pin will not enable a fraudster who gains possession of the magnetic stripe information to successfully use or access any money or accounts of the card owner in any other way.

The fraud and skimmer detection process 350 may include, at 362, a step of transmitting feedback regarding the subject ATM, the feedback comprising evaluation regarding one or both of usage of the subject ATM and/or inspection of the subject ATM by the at least one individual. In implementations, such feedback may be transmitted from the at least one mobile device to the server 101, such as via cellular connection over the network 105 to at least one processor 102 of the server 101.

The fraud and skimmer detection process 350 may also include, at 364, a step of providing an incentive upon receipt of the feedback, to an account or device associated with the at least one individual involved with completing the instruction and/or providing the feedback. In some implementations, step 364 may be performed via the at least one processor 102 of the server 101, such as a server associated with an owner, a business, or a entity having interest in the subject transacting device or ATM. In some instances, the incentive may be monetary compensation, a credit, or the provision of some other item of value, such as a deposit and/or reward. According to other embodiments, providing such incentive may comprise one or both of transmitting gamification information, and/or a gamification award, to at least one individual involved with completed the instruction or providing the feedback. Such gamification may include, for example, a leaderboard or other suitable ways of recognizing those who are providing such feedback in more helpful or valuable ways.

According to some embodiments, methods herein may also comprise establishing a risk level for the transacting devices or ATMs based on one or more of: crime rate information associated with the location of each ATM; fraud information associated with each ATM; a fraud rate associated with each ATM; one or more reports or news articles regarding fraud or crime associated with the location of each ATM; and/or information regarding video or other surveillance coverage of each ATM.

According to some embodiments, methods herein may also comprise, when the risk level is determined to be higher than the risk threshold for the subject device or ATM, searching for mobile devices of individuals associated with the at least one entity that are within a proximity of the subject ATM.

According to some embodiments, methods herein may also comprise transmitting one or more of location information, navigation instructions, and/or map application data, to the at least one mobile device of the at least one individual that provide direction to the subject ATM.

According to some embodiments, methods herein may also comprise increasing a risk level associated with the subject ATM, when the feedback indicates that the subject ATM may be compromised.

Further, particularly when the risk level is determined to be increased such as when the feedback indicates that the subject ATM may be compromised with a skimmer, embodiments herein may also comprise generating and transmitting additional push notifications to one or more other individuals associated with the at least one financial institution, to evaluate whether or not the subject ATM has been compromised with the skimmer.

According to some embodiments, methods herein may also comprise determining, by the feedback, that the subject device or ATM has been compromised; and/or initiating at least one additional security measure, such as measures to protect individuals who used or use the subject ATM. In implementations, the at least one additional security measure may comprise one or more of: placing a hold on ATM cards that were used with the subject ATM; automatically reissuing the ATM cards that were used with the subject ATM; increasing a fraud risk score of one or more accounts associated with the ATM cards that were used with the subject ATM; transmitting, to devices or accounts associated with the one or more users who used or use the subject ATM, at least one fraud notification including one or both of: (i) information regarding usage of the subject ATM determined to be compromised; and/or (ii) an action to take or a risk associated with usage of a compromised ATM; notifying third parties or others of the compromised device or ATM, including law enforcement, other entities (e.g., financial institutions), and/or other potential customers or users of the device or ATM; pulling camera footage of the subject device or ATM to assess when the machine was compromised and who committed the fraud; turning off the subject device or ATM; and/or sending a repair and/or fraud team to assess and fix the compromised device or ATM.

Further, it is noted that the disclosed systems, platforms, methods, and computer-readable media comprise fraud and skimmer detection mechanisms that may include and/or involve a software application configured to perform various automated, mobile device functionality set forth herein. Unlike conventional software and solutions, various embodiments disclosed herein may utilize an improved fraud and skimmer detection that may, via the use of a push notification and performing various mobile-device-based location, evaluation and feedback regarding the usage and/or inspection of a subject transacting device or ATM, be configured to provide improved determinations as to whether the subject device or ATM has been compromised. In these and other ways, implementations involving the software empowered with the exemplary disclosed mobile-device-based fraud and skimmer detection mechanisms represents an improvement over any conventional fraud and skimmer detection techniques known.

Aspects of the disclosed fraud and skimmer detection mechanisms also yield more efficient and otherwise improved utilization of both processing and communication resources, such as via determination that a subject device or ATM has a risk level higher than a risk threshold, generating and transmitting push notifications to a mobile device, as well as via quick, easy and effective technological solution to obtain feedback evaluating the subject device or ATM. Moreover, various exemplary embodiments enabled by the disclosed detection mechanisms may allow for improved responsiveness, efficiency, accuracy, and crowdsourcing ability of detecting skimmer and other types of fraudulent activities at transacting devices such as ATMs, and reducing likelihood that owners of mobile devices executing such software are exposed to fraud such as skimmer fraud at such transacting devices, thereby reducing or eliminating the need for unnecessary processing caused by fraudulent transactions otherwise avoided by the present detection mechanisms.

Figure 4:
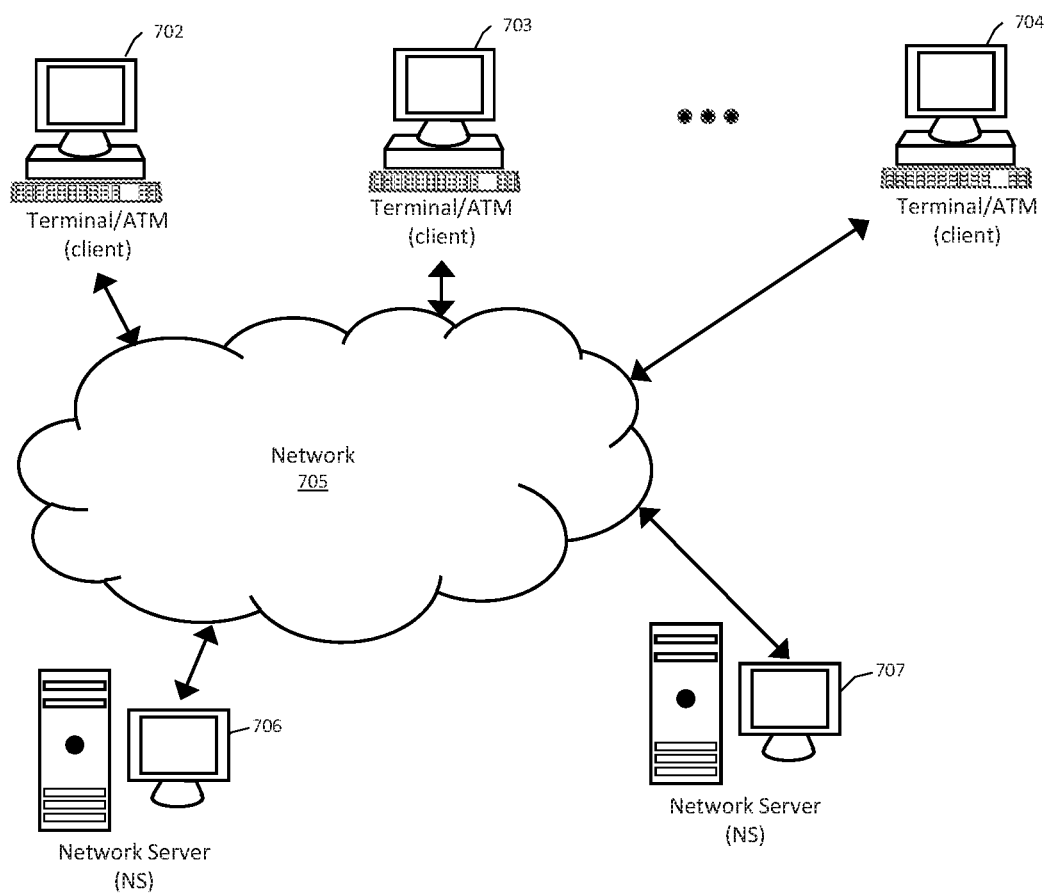
FIG. 4 is a block diagram depicting an exemplary computer-based system and/or platform, in accordance with certain embodiments of the present disclosure.

FIG. 4 depicts a block diagram of an exemplary computer-based system/platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform may be configured to manage a large number of instances of software applications, users, and/or concurrent transactions, as detailed herein. In some embodiments, the exemplary computer-based system/platform may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 4, members 702-704 (e.g., POS devices or clients) of the exemplary computer-based system/platform may include virtually any computing device capable of receiving and sending a message over a network (e.g., cloud network), such as network 705, to and from another computing device, such as servers 706 and 707, each other, and the like. In some embodiments, the member devices 702-704 may be personal computers, multiprocessor systems, microprocessor-based or programmable consumer electronics, network PCs, and the like. In some embodiments, one or more member devices within member devices 702-704 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 702-704 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 702-704 may include may run one or more applications, such as Internet browsers, mobile applications, voice calls, video games, videoconferencing, and email, among others. In some embodiments, one or more member devices within member devices 702-704 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 702-704 may be specifically programmed by either Java, .Net, QT, C, C++ and/or other suitable programming language. In some embodiments, one or more member devices within member devices 702-704 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 705 may provide network access, data transport and/or other services to any computing device coupled to it. In some embodiments, the exemplary network 705 may include and implement at least one specialized network architecture that may be based at least in part on one or more standards set by, for example, without limitation, GlobalSystem for Mobile communication (GSM) Association, the Internet Engineering Task Force (IETF), and the Worldwide Interoperability for Microwave Access (WiMAX) forum. In some embodiments, the exemplary network 705 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 705 may include and implement, as an alternative or in conjunction with one or more of the above, a WiMAX architecture defined by the WiMAX forum. In some embodiments and, optionally, in combination of any embodiment described above or below, the exemplary network 705 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 705 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 705 may also include mass storage, such as network attached storage (NAS), a storage area network (SAN), a content delivery network (CDN) or other forms of computer- or machine-readable media.

In some embodiments, the exemplary server 706 or the exemplary server 707 may be a web server (or a series of servers) running a network operating system, examples of which may include but are not limited to Microsoft Windows Server, Novell NetWare, or Linux. In some embodiments, the exemplary server 706 or the exemplary server 707 may be used for and/or provide cloud and/or network computing. Although not shown in FIG. 4, in some embodiments, the exemplary server 706 or the exemplary server 707 may have connections to external systems like email, SMS messaging, text messaging, ad content providers, etc. Any of the features of the exemplary server 706 may be also implemented in the exemplary server 707 and vice versa.

In some embodiments, one or more of the exemplary servers 706 and 707 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 701-704.

In some embodiments and, optionally, in combination of any embodiment described above or below, for example, one or more exemplary computing member devices 702-704, the exemplary server 706, and/or the exemplary server 707 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 5:
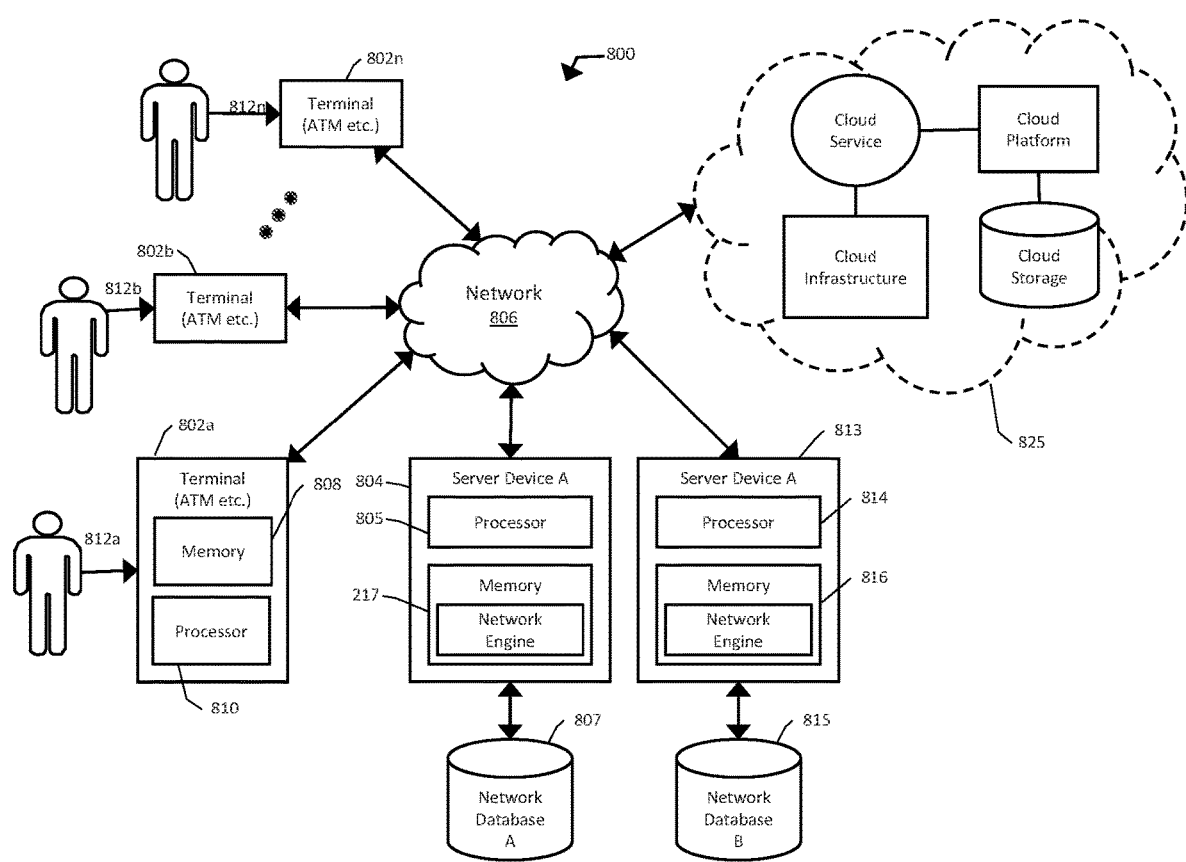
FIG. 5 is a block diagram depicting another exemplary computer-based system and/or platform, in accordance with certain embodiments of the present disclosure.

FIG. 5 depicts a block diagram of another exemplary computer-based system/platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices (e.g., POS devices) 802a, 802b through 802n shown each at least includes a computer-readable medium, such as a random-access memory (RAM) 808 coupled to a processor 810 and/or memory 808. In some embodiments, the processor 810 may execute computer-executable program instructions stored in memory 808. In some embodiments, the processor 810 may include a microprocessor, an ASIC, and/or a state machine. In some embodiments, the processor 810 may include, or may be in communication with, media, for example computer-readable media, which stores instructions that, when executed by the processor 810, may cause the processor 810 to perform one or more steps described herein. In some embodiments, examples of computer-readable media may include, but are not limited to, an electronic, optical, magnetic, or other storage or transmission device capable of providing a processor, such as the processor 810 of client 802a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 802a through 802n may also comprise a number of external or internal devices such as a mouse, a CD-ROM, DVD, a physical or virtual keyboard, a display, or other input or output devices. In some embodiments, examples of member computing devices 802a through 802n (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, member computing devices 802a through 802n may be specifically programmed with one or more application programs in accordance with one or more principles/methodologies detailed herein. In some embodiments, member computing devices 802a through 802n may operate on any operating system capable of supporting a browser or browser-enabled application, such as Microsoft™ Windows™, and/or Linux. In some embodiments, member computing devices 802a through 802n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 802a through 802n, users, 812a through 812n, may communicate over the exemplary network 806 with each other and/or with other systems and/or devices coupled to the network 806. As shown in FIG. 5, exemplary server devices 804 and 813 may be also coupled to the network 806. In some embodiments, one or more member computing devices 802a through 802n may be mobile clients.

In some embodiments, at least one database of exemplary databases 807 and 815 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
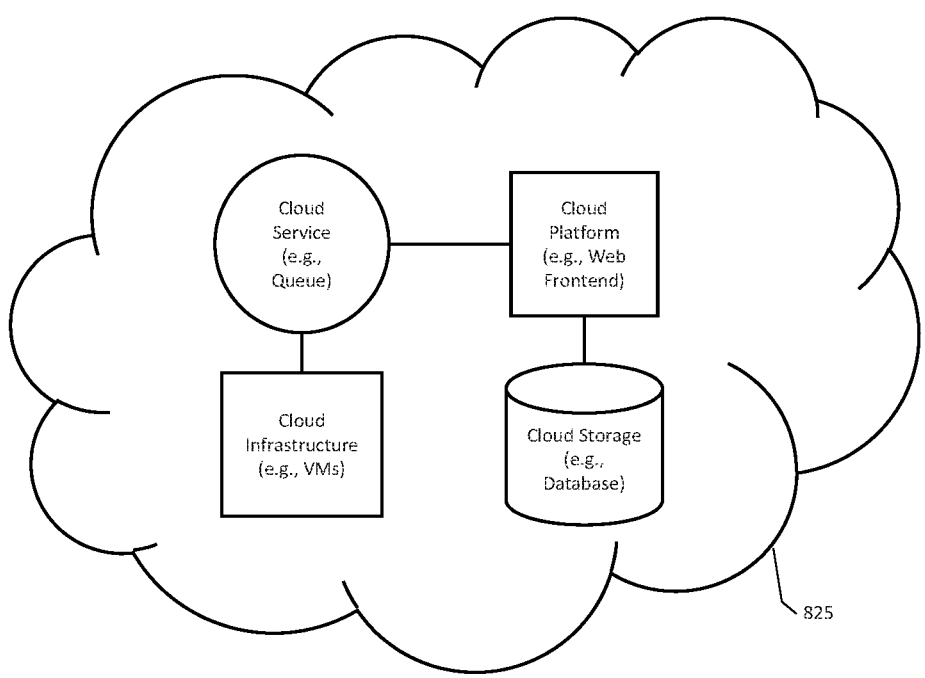
FIGS. 6 and 7 are diagrams illustrating two exemplary implementations of cloud computing architecture/aspects with respect to which the disclosed technology may be specifically configured to operate, in accordance with certain embodiments of the present disclosure.
Figure 7:
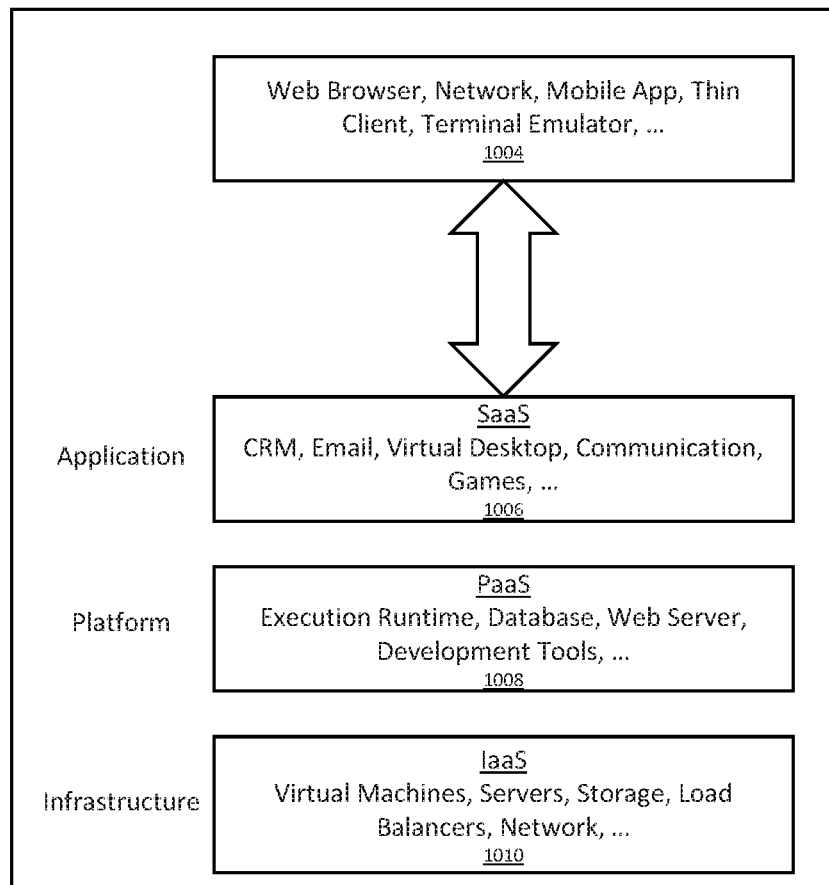

As also shown in FIGS. 6 and 7, some embodiments of the disclosed technology may also include and/or involve one or more cloud components 825, which are shown grouped together in the drawing for sake of illustration, though may be distributed in various ways as known in the art. Cloud components 825 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

According to some embodiments shown by way of one example in FIG. 7, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 1010, platform as a service (PaaS) 1008, and/or software as a service (SaaS) 1006. FIGS. 6 and 7 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate. In some embodiments, such cloud architecture 1006, 1008, 1010 may be utilized in connection with the Web browser and browser extension aspects, shown at 1004, to achieve various embodiments detailed herein.

As used in the description and in any claims, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.). Computer-related systems, computer systems, and systems, as used herein, include any combination of hardware and software.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIG. 6-7) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) Ios; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37) Open Web Platform; (38) Oracle Database; (39) Qt; (40) SAP NetWeaver; (41) Smartface; (42) Vexi; and/OR (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

Clause 1. A computer-implemented method comprising:
generating, by at least one processor associated with at least one entity, such as a financial institution, a database of information regarding risk levels of a plurality of transacting devices, such as automated teller machines (ATMs);
determining that a subject transacting devices (e.g. ATM, etc.) of the plurality of transacting devices has a risk level higher than a risk threshold;
generating and transmitting, to at least one mobile device proximal to the subject transacting device, a push notification to the least one mobile device, the at least one mobile device associated with at least one individual known by the at least one entity;
executing, upon acceptance of the push notification by the at least one individual, a software application executed by the at least one mobile device, the software application comprising:
transmitting information or instructions to the at least one mobile device that direct the at least one individual to the subject transacting device;
detecting when the at least one individual is located at the subject transacting device;
providing an instruction for the at least one individual to facilitate an interaction with the subject transacting device by one or both of the at least one mobile device and/or the at least one individual, the interaction including using the subject transacting device and/or perform at least one inspection action regarding the subject transacting device;
gathering information, by the at least one mobile device, regarding the subject transacting device;
transmitting feedback, from the at least one mobile device to the at least one processor, regarding the subject transacting device, the feedback comprising evaluation regarding one or both of usage of the subject transacting device and/or inspection of the subject transacting device; and
providing an incentive, via the least one processor, upon receipt of the feedback, to an account or device associated with the at least one individual involved with performance of the instruction.

Clause 2. The method of clause 1 or of any clause herein, further comprising:
establishing a risk level for the ATMs based on one or more of crime rate information associated with location of each ATM, fraud information associated with each ATM, a fraud rate associated with each ATM, one or more reports or news articles regarding fraud or crime associated with location of each ATM, and/or information regarding video or other surveillance coverage of each ATM.

Clause 3. The method of clause 1 or of any clause herein, further comprising:
when the risk level is determined to be higher than the risk threshold for the subject ATM, performing a search to identify the at least one mobile device proximal to the subject ATM.

Clause 4. The method of clause 1 or of any clause herein, wherein the push notification further comprises an inquiry asking if the at least one individual is willing to perform at least one fraud-prevention task associated with the subject ATM.

Clause 5. The method of clause 1 or of any clause herein, wherein the information or instructions comprise one or more of location information, navigation instructions, and/or map application data sent to the at least one mobile device of the at least one individual, which provide directions to the subject ATM.

Clause 6. The method of clause 1 or of any clause herein, wherein the detecting when the at least one individual is located at the subject ATM comprises one or both of: (i) detecting presence of the at least one individual by a camera at or adjacent the subject ATM, and/or (ii) determining whether or not the at least one individual is located at the subject ATM via location-determining functionality of the at least one mobile device.

Clause 7. The method of clause 1 or of any clause herein, wherein the push notification further comprises education information regarding how to detect fraud potentially being perpetrated via the subject ATM and/or how to detect whether the subject ATM has been compromised by addition of a skimmer.

Clause 8. The method of clause 1 or of any clause herein, wherein the push notification further comprises an information overlay of augmented reality (AR) to provide an improved user experience with the subject ATM for the at least one individual.

Clause 9. The method of clause 1 or of any clause herein, wherein the incentive comprises transmitting gamification information or a gamification award to at least one individual who completed the instruction.

Clause 10. The method of clause 1 or of any clause herein, further comprising, when the feedback indicates that the subject ATM may be compromised:
increasing a risk level associated with the subject ATM.

Clause 11. The method of clause 1 or of any clause herein, further comprising, when the feedback indicates that the subject ATM may be compromised with a skimmer:
generating and transmitting additional push notifications to one or more other individuals associated with the at least one entity, to evaluated whether or not the subject ATM has been compromised with the skimmer.

Clause 12. The method of clause 1 or of any clause herein, further comprising:

determining, by the feedback, that the subject ATM has been compromised; and initiating at least one additional security measure for one or more users who used or use the subject ATM.

Clause 13. The method of clause 12 or of any clause herein, wherein the at least one additional security measure comprises one or more of:

placing a hold on ATM cards that were used with the subject ATM;

automatically reissuing the ATM cards that were used with the subject ATM;

increasing a fraud risk score of one or more accounts associated with the ATM cards that were used with the subject ATM; and/or transmitting, to devices or accounts associated with the one or more users who used or use the subject ATM, at least one fraud notification including one or both of: (i) information regarding usage of the subject ATM determined to be compromised, and/or (ii) an action to take or a risk associated with usage of a compromised ATM.

Clause 14. A computer-implemented method comprising:

generating, by at least one processor associated with at least one entity, a database of information regarding risk levels of a plurality of transacting devices, such as automated teller machines (ATMs);

determining that a subject transacting device of the plurality of transacting devices has a risk level higher than a risk threshold;

generating and transmitting, to at least one mobile device proximal to the subject transacting device, a push notification to the least one mobile device, the at least one mobile device associated with at least one individual known by the at least one entity;

providing, upon acceptance of the push notification by the at least one individual, an instruction to the at least one mobile device instructing the at least one individual to one or both of use the subject transacting device and/or perform at least one inspection action regarding the subject transacting device;

detecting when the at least one individual is located at the subject transacting device;

transmitting feedback, from the at least one mobile device to the at least one processor, regarding the subject transacting device, the feedback comprising evaluation regarding one or both of usage of the subject transacting device and/or inspection of the subject transacting device by the at least one individual; and providing an incentive, via the least one processor, upon receipt of the feedback, to an account or device associated with the at least one individual associated with performing the instruction.

Clause 15. The method of clause 14 or of any clause herein, further comprising:

establishing a risk level for the ATMs based on one or more of crime rate information associated with location of each ATM, fraud information associated with each ATM, a fraud rate associated with each ATM, one or more reports or news articles regarding fraud or crime associated with location of each ATM, and/or information regarding video or other surveillance coverage of each ATM.

Clause 16. The method of clause 14 or of any clause herein, further comprising:

when the risk level is determined to be higher than the risk threshold for the subject ATM, searching for mobile devices of individuals associated with the at least one entity that are within a proximity of the subject ATM.

Clause 17. The method of clause 14 or of any clause herein, wherein the push notification further comprises an inquiry asking if the at least one individual is willing to perform at least one fraud-prevention task associated with the subject ATM.

Clause 18. The method of clause 14 or of any clause herein, further comprising:

transmitting one or more of location information, instructions, and/or map application data to the at least one mobile device of the at least one individual that provide direction to the subject ATM.

Clause 19. The method of clause 14 or of any clause herein, wherein the detecting when the at least one individual is located at the subject ATM comprises one or both of: (i) detecting presence of the at least one individual by a camera at or adjacent the subject ATM, and/or (ii) determining whether or not the at least one individual is located at the subject ATM via location-determining functionality of the at least one mobile device.

Clause 20. The method of clause 14 or of any clause herein, wherein the push notification further comprises education information regarding how to detect fraud potentially being perpetrated via the subject ATM and/or how to detect whether the subject ATM has been compromised by addition of a skimmer.

Clause 21. The method of clause 14 or of any clause herein, wherein the push notification further comprises an information overlay of augmented reality (AR) to provide an improved user experience with the subject ATM for the at least one individual.

Clause 22. The method of clause 14 or of any clause herein, wherein the incentive comprises transmitting gamification information or a gamification award to at least one individual who completed the instruction.

Clause 23. The method of clause 14 or of any clause herein, further comprising, when the feedback indicates that the subject ATM may be compromised:

increasing a risk level associated with the subject ATM.

Clause 24. The method of clause 14 or of any clause herein, further comprising, when the feedback indicates that the subject ATM may be compromised with a skimmer:

generating and transmitting additional push notifications to one or more other individuals associated with the at least one entity, to evaluated whether or not the subject ATM has been compromised with the skimmer.

Clause 25. The method of clause 14 or of any clause herein, further comprising:

determining, by the feedback, that the subject ATM has been compromised; and initiating at least one additional security measure for one or more users who used or use the subject ATM.

Clause 26. The method of clause 25 or of any clause herein, wherein the at least one additional security measure comprises one or more of:

placing a hold on ATM cards that were used with the subject ATM;

automatically reissuing the ATM cards that were used with the subject ATM;

increasing a fraud risk score of one or more accounts associated with the ATM cards that were used with the subject ATM; and/or transmitting, to devices or accounts associated with the one or more users who used or use the subject ATM, at least one fraud notification including one or both of: (i) information regarding usage of the subject ATM determined to be compromised, and/or (ii) an action to take or a risk associated with usage of a compromised ATM.

Clause 27. Embodiments herein may also take the form of a system comprised of components such as computing and/or computer-related elements that are arranged, programmed and/or otherwise adapted to perform the features and functionality set forth anywhere above. Such computing elements may include and/or involve computer readable media.

Clause 28, Embodiments herein may also involve a transaction card and/or components or electronic/computing elements associated therewith, configured, programmed and/or otherwise adapted for involvement with one or more aspects of the features and functionality set forth anywhere above.

Clause 29. In addition, embodiments herein may also take the form of one or more computer readable media containing computer-executable instructions for performing any of the processing herein, the computer-executable instructions being executable via one or more processing components to process instructions and/or perform one or more aspects of the functionality set forth herein.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A computer-implemented method comprising:
   receiving, by at least one processor, automated teller machine (ATM)-specific activity information from a subject ATM of a plurality of automated teller machines (ATMs);
   predicting, by the at least one processor, an ATM-specific risk level of a fraudulent activity to occur at the subject ATM of the plurality of ATMs based on a risk model, the ATM-specific activity information from the subject ATM, and overall risk information regarding risk levels of the plurality of ATMs;
   determining, by the at least one processor, that the ATM-specific risk level of the subject ATM is higher than a risk threshold;
   determining, by the at least one processor, when the ATM-specific risk level is higher than the risk threshold, that at least one mobile device is proximal to the subject ATM based on a geographic association with the subject ATM, the at least one mobile device associated with at least one individual;
   transmitting, by the at least one processor, to the at least one mobile device proximal to the subject ATM, a push notification;
   instructing, by the at least one processor, upon acceptance of the push notification by the at least one individual, a software application executed by the at least one mobile device to perform the steps of:
      transmitting, via the at least one mobile device, an incentive to the at least one individual to approach the subject ATM; and
      providing, on a screen of the at least one mobile device, when the at least one individual is determined to be located at the subject ATM, at least one instruction to the at least one individual to interact with the subject ATM by one or both of utilizing the at least one mobile device or directly activating at least one component of the subject ATM so as to induce the at least one individual to use the subject ATM to perform at least one inspection action regarding the subject ATM;
   processing, via the at least one processor, feedback regarding the subject ATM, the feedback comprising an evaluation regarding one or both of a usage of the subject ATM or an inspection of the subject ATM; and
   providing, via the at least one processor, based on the feedback, the incentive to the at least one individual.

2. The method of claim 1, further comprising:
   establishing a risk level for each of the plurality of ATMs based on one or more of crime rate information associated with location of each ATM, fraud information associated with each ATM, a fraud rate associated with each ATM, one or more reports or news articles regarding fraud or crime associated with location of each ATM, information regarding video or other surveillance coverage of each ATM, and/or information regarding how recently each ATM was last inspected or evaluated.

3. The method of claim 1 further comprising:
   when the risk level is determined to be higher than the risk threshold for the subject ATM, performing a search to identify the at least one mobile device proximal to the subject ATM.

4. The method of claim 1 wherein the push notification further comprises an inquiry asking if the at least one individual is willing to perform at least one fraud-prevention task associated with the subject ATM.

5. The method of claim 1, wherein the direction comprises one or more of location information, navigation instructions, and/or map application data sent to the at least one mobile device of the at least one individual, which provide directions to the subject ATM.

6. The method of claim 1 wherein the detecting when the at least one individual is located at the subject ATM comprises one or both of: (i) detecting presence of the at least one individual by a camera at or adjacent the subject ATM, or (ii) determining whether or not the at least one individual is located at the subject ATM via location-determining functionality of the at least one mobile device.

7. The method of claim 1 wherein the push notification further comprises education information regarding how to detect fraud potentially being perpetrated via the subject ATM and/or how to detect whether the subject ATM has been compromised by addition of a skimmer.

8. The method of claim 1 wherein the push notification further comprises an information overlay of augmented reality (AR) to provide an improved user experience with the subject ATM for the at least one individual.

9. The method of claim 1 wherein the incentive comprises transmitting gamification information or a gamification award to at least one individual who completed the instruction.

10. The method of claim 1 further comprising, when the feedback indicates that the subject ATM may be compromised:
    increasing a risk level associated with the subject ATM.

11. The method of claim 1 further comprising, when the feedback indicates that the subject ATM may be compromised with a skimmer:

generating and transmitting additional push notifications to one or more other individuals, to evaluate whether or not the subject ATM has been compromised with the skimmer.

12. The method of claim 1 further comprising:
determining, by the feedback, that the subject ATM has been compromised; and
initiating at least one additional security measure for one or more users who used or use the subject ATM, wherein the at least one additional security measure comprises one or more of:
placing a hold on ATM cards that were used with the subject ATM;
automatically reissuing the ATM cards that were used with the subject ATM;
increasing a fraud risk score of one or more accounts associated with the ATM cards that were used with the subject ATM; or
transmitting, to devices or accounts associated with the one or more users who used or use the subject ATM, at least one fraud notification including one or both of: (i) information regarding usage of the subject ATM determined to be compromised, and/or (ii) an action to take or a risk associated with usage of a compromised ATM.

13. One or more non-transitory computer-readable media storing instructions that, when executed by at least one processor, cause the at least one processor to perform operations comprising:
processing, by the at least one processor, activity information from a subject ATM of a plurality of automated teller machines (ATMs);
predicting, via the at least one processor, a risk level of a fraudulent activity to occur at the subject ATM of the plurality of ATMs based on a risk model and one or both of the activity information from the subject ATM and information regarding risk levels of the plurality of ATMs;
determining, via the at least one processor: that the risk level of the subject ATM is higher than a risk threshold, and, when the risk level is higher than the risk threshold, that at least one mobile device is proximal to the subject ATM based on a geographic association with the subject ATM, the at least one mobile device being associated with at least one individual;
providing, by the at least one processor, upon acceptance, by the at least one individual, of a push notification generated and/or transmitted via the at least one processor, one or more instructions to the at least one mobile device instructing the at least one individual to one or both of use the subject ATM and/or perform at least one inspection action regarding the subject ATM, the one or more instructions executed by the at least one mobile device to perform the steps of:
transmitting, via the at least one mobile device, an incentive to the at least one individual to approach the subject ATM; and
providing, on the screen of the at least one mobile device, when the at least one individual is determined to be located at the subject ATM, at least one instruction to the at least one individual to interact with the subject ATM by one or both of utilizing the at least one mobile device or directly activating at least one component of the subject ATM so as to induce the at least one individual to one or both of use the subject ATM, or to perform at least one inspection action regarding the subject ATM;
processing, via the at least one processor, feedback regarding the subject ATM, the feedback comprising an evaluation regarding one or both of usage of the subject ATM or inspection of the subject ATM by the at least one individual; and
providing, via the at least one processor, based on the feedback, the incentive to the at least one individual.

14. The computer-readable media of claim 13, wherein the instructions cause the at least one processor to perform operations further comprising:
establishing a risk level for each of the plurality of ATMs based on one or more of crime rate information associated with location of each ATM, fraud information associated with each ATM, a fraud rate associated with each ATM, one or more reports or news articles regarding fraud or crime associated with location of each ATM, and/or information regarding video or other surveillance coverage of each ATM.

15. The computer-readable media of claim 13, wherein the instructions cause the at least one processor to perform operations further comprising:
when the risk level is determined to be higher than the risk threshold for the subject ATM, searching for mobile devices that are within a proximity of the subject ATM.

16. The computer-readable media of claim 13 wherein the push notification further comprises an inquiry asking if the at least one individual is willing to perform at least one fraud-prevention task associated with the subject ATM.

17. The computer-readable media of claim 13, wherein the instructions cause the at least one processor to perform operations further comprising:
transmitting one or more of location information, navigation instructions, and/or map application data to the at least one mobile device of the at least one individual that provide direction to the subject ATM.

18. The computer-readable media of claim 13 wherein the detecting when the at least one individual is located at the subject ATM comprises one or both of: (i) detecting presence of the at least one individual by a camera at or adjacent the subject ATM, and/or (ii) determining whether or not the at least one individual is located at the subject ATM via location-determining functionality of the at least one mobile device.

19. The computer-readable media of claim 13 wherein the push notification further comprises education information regarding how to detect fraud potentially being perpetrated via the subject ATM and/or how to detect whether the subject ATM has been compromised by addition of a skimmer.

20. A system comprising:
one or more computing devices, including at least one processor;
one or more non-transitory computer-readable media storing instructions that are executed by at least one processor, and which cause the at least one processor to perform operations comprising:
receiving, by the at least one processor, automated teller machine (ATM)-specific activity information from a subject ATM of a plurality of automated teller machines (ATMs);
predicting, by the at least one processor, an ATM-specific risk level of a fraudulent activity to occur at the subject ATM of the plurality of ATMs based on a risk model, the ATM-specific activity information from the subject ATM, and overall risk information regarding risk levels of the plurality of ATMs;

determining, by the at least one processor, that the ATM-specific risk level of the subject ATM is higher than a risk threshold;

performing processing, by the at least one processor, to determine: when the ATM-specific risk level is higher than the risk threshold; and, when the ATM-specific risk level is higher than the risk threshold, that at least one mobile device is proximal to the subject ATM based on a geographic association with the subject ATM, the at least one mobile device associated with at least one individual;

transmitting, via the at least one processor, to the at least one mobile device proximal to the subject ATM, a push notification;

instructing, by the at least one processor, upon acceptance of the push notification by the at least one individual, a software application executed by the at least one mobile device to perform the steps of:

providing, via the at least one mobile device, an incentive to the at least one individual to approach the subject ATM; and providing, on the screen of the at least one mobile device, when the at least one individual is determined to be located at the subject ATM, at least one instruction to the at least one individual to interact with the subject ATM by one or both of utilizing the at least one mobile device or directly activating at least one component of the subject ATM so as to induce the at least one individual to use the subject ATM to perform at least one inspection action regarding the subject ATM;

processing, via the at least one processor, feedback regarding the subject ATM, the feedback comprising an evaluation regarding one or both of a usage of the subject ATM or an inspection of the subject ATM; and providing, via the at least one processor, based on the feedback, the incentive to the at least one individual.

* * * * *